United States Patent [19]

Hervé et al.

[11] Patent Number: 4,648,419
[45] Date of Patent: Mar. 10, 1987

[54] ASSEMBLY OF PIPES

[75] Inventors: Jean-Luc Hervé, Noisy-le-Grand; Jean-Francois Jouanneau, Cassis, both of France; Ivar G. Kristensen, Forus; Finn Haugen, Notodden, both of Norway

[73] Assignees: Total Compagnie Francaise des Petroles, France; Den Norske Stats Oljeselskap A/S, Norway

[21] Appl. No.: 794,996

[22] Filed: Nov. 4, 1985

[30] Foreign Application Priority Data

Nov. 2, 1984 [NO] Norway .................................. 844356

[51] Int. Cl.$^4$ ........................ B08B 9/06; F16K 51/00
[52] U.S. Cl. .................................. 137/245.5; 137/319; 138/94; 251/324
[58] Field of Search ............... 137/317, 319, 320, 322, 137/242, 244, 245.5; 138/89, 93, 94, 92; 251/324, 325, 63

[56] References Cited

U.S. PATENT DOCUMENTS

| | | | |
|---|---|---|---|
| 1,135,498 | 4/1915 | Carpenter | 137/245.5 |
| 1,910,698 | 5/1933 | King | 251/325 |
| 2,037,873 | 4/1936 | Angell | 137/244 |
| 2,771,096 | 11/1956 | Ver Nooy | 138/89 |
| 3,766,947 | 10/1973 | Osburn | 138/89 |
| 3,923,082 | 12/1975 | Blazek | 138/89 |
| 3,991,791 | 11/1976 | Luckenbill | 138/94 |
| 4,335,757 | 6/1982 | Lankston | 138/94 |

Primary Examiner—George L. Walton
Attorney, Agent, or Firm—Sughrue, Mion, Zinn, Macpeak, and Seas

[57] ABSTRACT

The present invention concerns an assembly of pipes, particularly but not exclusively submarine pipes, adapted to permit disconnection of a tubular member therefrom while maintaining the interior of the remainder of the assembly isolated therefrom. The assembly comprises a first pipe provided with a first tubular connection portion for coaxial connection to a second tubular connection portion of a tubular member. The tubular member is also provided with a tubular extension which is coaxial with the second connection portion and houses a closure means. The end of the tubular extension is adapted to receive the casing of a manipulator for moving the closure means from the tubular extension into the first connection portion of the first pipe to isolate the first pipe from the tubular member and permit disconnection thereof. The other end of the tubular member may, for example, be connected to a scraper station, or may be provided with a tubular extension housing closure means and coaxial with a third connection portion for coaxial connection to a fourth connection portion of a second pipe connected to the first pipe by the tubular portion.

7 Claims, 8 Drawing Figures

ASSEMBLY OF PIPES

The invention relates to an assembly of pipes, particularly but not exclusively submarine pipes.

With an assembly of pipes it may be necessary to disconnect a tubular member therefrom and reconnect it in the assembly of pipes while maintaining interior or interiors in the remainder of the assembly of pipes closed to the outside.

In the case of a submarine assembly, it is desirable to be able to carry out repair, maintenance or inspection work on equipment, such for example as valves or scraper stations, which are inserted in a tubular member of the assembly, by withdrawing the member without having to flood the remainder of the assembly with water. If the tubular member belongs to a secondary line which is connected to a main line, the latter can then continue to be used while the secondary line is disconnected.

Two processes for intervention in a submerged pipe are known, which are respectively called "hot tapping" and "cold tapping", and which have the advantage of permitting intervention at any point in the pipe, but entail the disadvantage of requiring welding or the fitting of mechanical connectors for the restoration of the pipe, while in addition the "hot tapping" process requires the permanent addition of T-pieces to the pipe.

The present invention concerns steps to be taken during the installation of the assembly of pipes, at one or more predetermined points with a view to enabling withdrawal of a tubular member in or on which is provided equipment which may require inspection, maintenance or repair.

According to the invention there is provided an assembly of pipes which comprises a first pipe provided with a first tubular connection portion, a tubular member providing at one end a second tubular connection portion, and connecting means for connecting the first and second connection portions coaxially to one another, the portion of the tubular member which is adjacent to the second connection portion diverging from the axis of the connection portion, characterised in that the tubular member is provided with an external tubular extension which is coaxial with the second connection portion and which receives displaceable closure means for closing either the tubular extension or the first connection portion, fastening means being provided for connecting to the tubular extension the casing of a manipulator for displacing the closure means between the tubular extension and the first connection portion.

Preferably the first tubular connection portion and the tubular extension are provided with internal grooves for receiving the closure means.

The fastening means may be arranged to permit the installation on the tubular extension of a cover in place of the manipulator casing. Advantageously at least one pipe provided with a valve for regulating the pressure in the tubular extension passes through the manipulator casing and the cover.

In order to effect the replacement of the closure means, if this should be required, an intermediate slide valve may be disposed on the tubular extension so as to be inserted between the latter and the manipulator casing or the cover.

The connecting means may comprise flanges. The fastening means may also comprise a flange which is provided on the tubular extension and is similar to the connection flange provided on the first connection portion, so that the cover may be connected either to the tubular extension or to the first connection portion.

The tubular member may make a connection between the first pipe and a second pipe and may be provided, at its other end, with a third tubular connection portion for connection to a fourth tubular connection portion provided on the second pipe, similar means to those described above being provided at the said other end so as to permit the simultaneous closure of the first and fourth connection portions before removal of the tubular member.

Embodiments according to the invention will now be described, by way of example only, with reference to the accompanying drawings.

Figure 1:
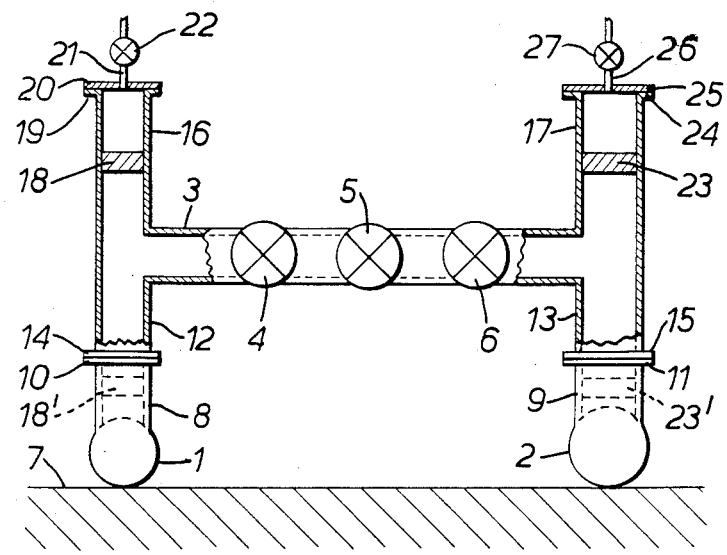
FIG. 1 is a partial vertical section of an embodiment according to the invention and comprising a tubular member connecting a secondary pipe to a main pipe.

In the assembly of FIG. 1 a secondary pipe 1 is connected to a main pipe 2 by a tubular member 3 in which are disposed a number of devices 4,5,6, such for example as valves, requiring periodic inspection. The pipes 1 and 2 are laid on a seabed 7, and each of them is provided with a vertical tubular connection portion 8,9 fitted with a connection flange 10,11. Similarly, the member 3, which extends substantially in a horizontal direction, carries at its ends vertical tubular connection portions 12,13 provided with flanges 14,15. The flange 14 is designed to be connected to the flange 10 by bolts (not shown), and the flange 15 is designed to be similarly connected to the flange 11.

The member 3 is provided with vertical tubular extensions 16,17 disposed coaxially with the connection portions 8,12 and 9,13 respectively. The tubular extension 16 has substantially the same diameter as the connection portions 8 and 12, and the tubular extension 17 has substantially the same diameter as the connection portions 9 and 13. A displaceable closure means 18 is disposed in the tubular extension 16. Closure means 18 may be an inflatable type or a mechanical type, a groove (e.g. groove 34 in FIG. 5) then being provided in the tubular extension 16 and in the connection portion 8 in order to receive the closure means. A possible position of the closure means 18 in the connection portion 8 is shown at 18'. The tubular extension 16 is provided at its upper end with a flange 19, on which can be fixed a cover 20, through which passes a pipe 21 provided with a valve 22. A displaceable closure means 23, similar to the closure means 18 except that it has a larger diameter, is disposed in the tubular extension 17 and can enter the connection portion 9 and be positioned therein at 23'. The tubular extension 17 ends at the top in a flange 24, on which can be fixed a cover 25, through which passes a pipe 26 provided with a valve 27.

Figure 2:
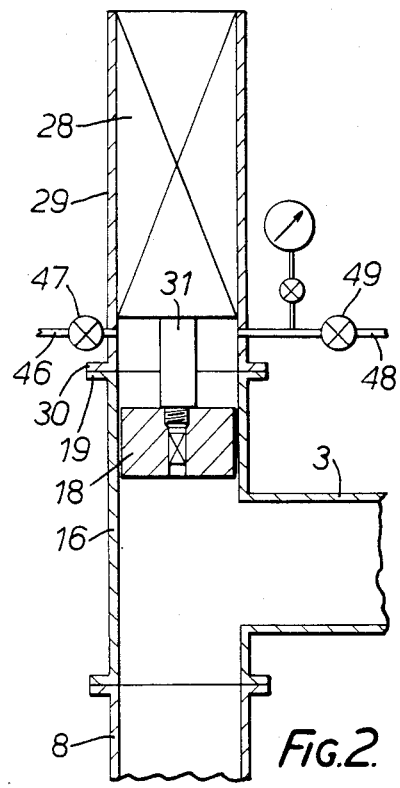
FIGS. 2 and 3 are views similar to that of FIG. 1, but to a larger scale, of a portion of the assembly of FIG. 1 after installation of a manipulator which, in FIG. 2, is shown simply engaging a closure means and, in FIG. 3, is shown having displaced the closure means.
Figure 3:
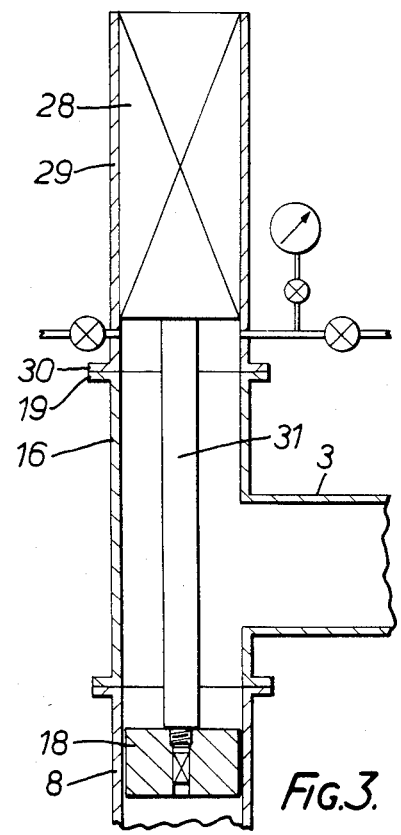
Figure 4:
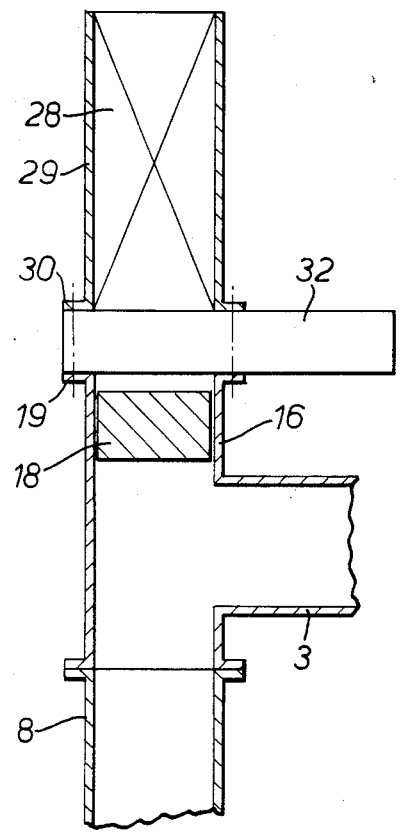
FIG. 4 shows diagrammatically a modified arrangement of a manipulator with the interposition of an intermediate valve.

When it is desired to manipulate the closure means 18 and 23, the covers 20 and 25 are replaced by manipulators, such as manipulator 28 shown in FIGS. 2, 3 and 4, whose casing 29 is provided with a flange 30 adapted to be fastened on the flange, such as flange 19, at the upper end of the corresponding tubular extension, such as extension 16.

A manipulator of this kind is provided with an operating rod 31 capable of making rotational movements in order to grip or engage the corresponding closure means, and translatory movements, through the action of a ram, in order to effect the displacement of the closure means from the tubular extension, such as extension 16, towards the connection portion, such as portion 8 connected to the corresponding pipe. In FIG. 2 the rod 31 is shown in the position in which it grips the closure means in the tubular extension, and in FIG. 3 the same rod is shown after it has displaced the closure means into the connection portions of the pipe.

Details of the construction of the closure means and manipulators have not been illustrated, because these are means which are well known in themselves.

FIG. 4 shows a modification in which an auxiliary valve 32, known as a "sandwich valve", is inserted between the flange 30 of the casing 29 of the manipulator 28 and the flange 19 of the tubular extension 16. In cases where a failure of the closure means 18 is observed, this makes it possible to raise the closure means into the casing 29 of the manipulator 28, then to close the auxiliary valve 32 and, with the aid of the manipulator 28, to bring the defective valve 18 to the surface for replacement or repair.

Figure 5:
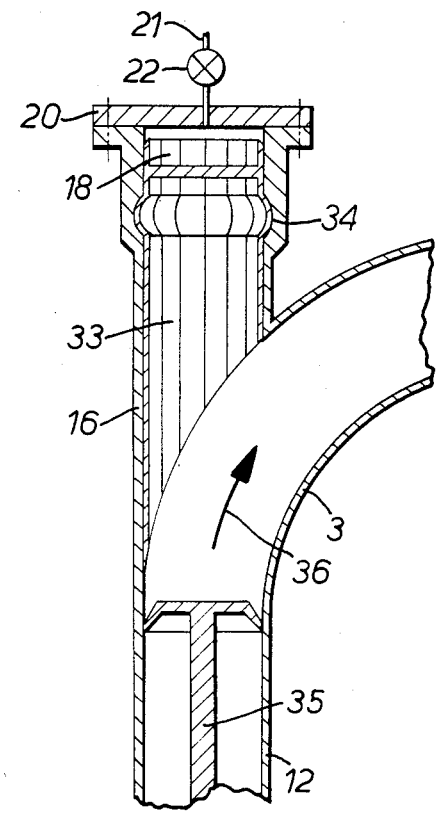
FIG. 5 is a vertical section of a modified closure means provided with a guide for the passage of scrapers.

In FIG. 5 the closure means 18 is provided at its lower end with an extension 33, the lower face of which, when the closure means is in the tubular extension 16, reconstitutes the internal geometry of the tubular member 3, which was distributed by the connection of the tubular extension 16, to a sufficient extent to serve as a guide for a scraper, such as scraper 35, which circulates in the direction of the arrow 36 inside the tubular member 3.

Figure 6:
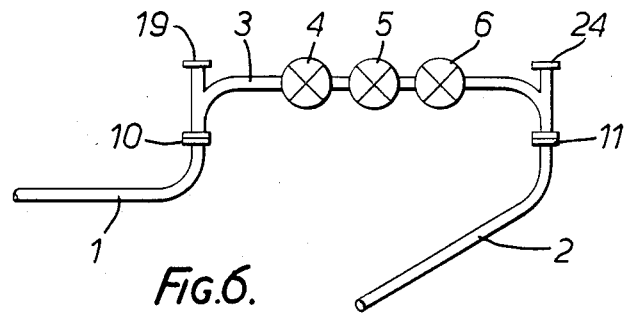
FIGS. 6, 7 and 8 are diagrammatic views of embodiments according to the invention.
Figure 7:
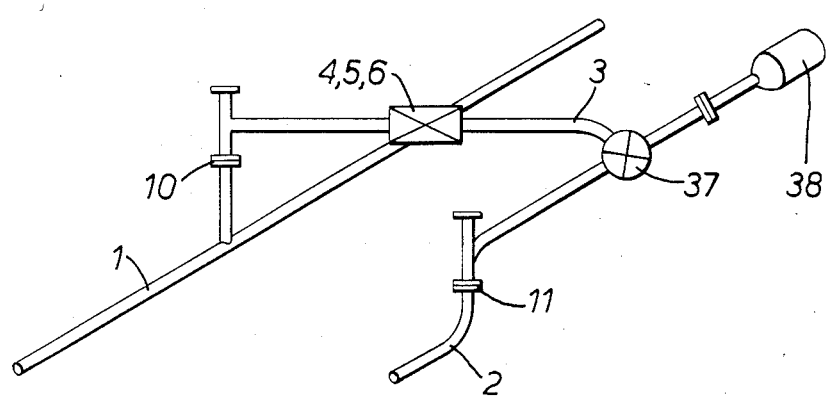
Figure 8:
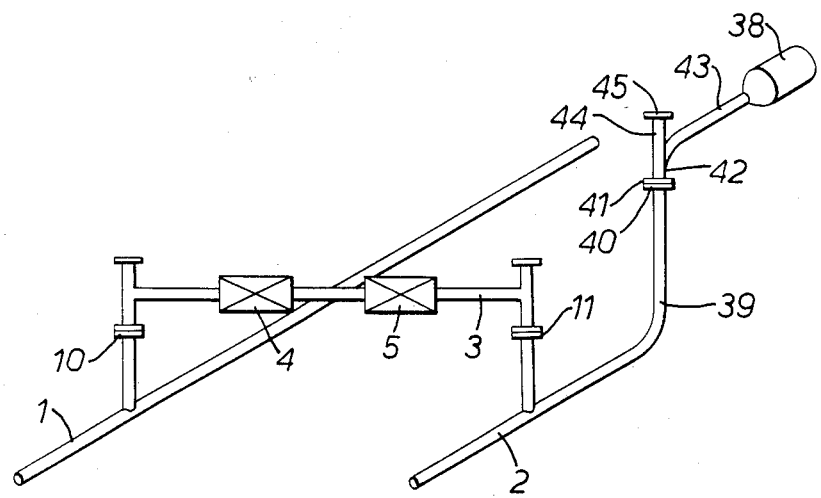

FIG. 6 shows diagrammatically the embodiment shown in FIG. 1 in order to permit better comparison with other embodiments shown diagrammatically in FIGS. 7 and 8.

The assembly of FIG. 7 again comprises two pipes 1 and 2, which may be different from those shown in FIG. 1 and which are connected by a tubular member 3 in a similar manner to that shown in FIG. 6, but a scraper station 38 has been connected to the tubular member 3 with the interposition of a multi-way valve 37.

In the assembly of FIG. 8 two pipes 1 and 2 are connected by a tubular member 3 as previously, but in addition the pipe 2 has at its end a tubular connection portion 39 provided with a flange 40 designed to receive the corresponding flange 41 of a tubular connection portion 42 of another tubular member 43 connected to a scraper station 38. The tubular member 43 has a tubular extension 44 provided with a flange 45. Like the tubular extension 16, the tubular extension 44 is provided with a closure means (not shown), which can be manipulated by a manipulator (not shown), adapted to be fixed to the flange 45, to displace the closure means between the tubular extension 44 and the connection portion 39.

A procedure for the utilisation of the arrangement shown in FIG. 1 will now be described with reference to the left-hand half of that Figure, the same operations being carried out with the means shown on the right-hand half of the Figure.

Starting from the position of the closure means 18 shown in the Figure, the pressure in the pipes is reduced and the chamber situated above the closure means 18 is decompressed. It is then possible to remove the cover 20 and to replace it with the manipulator 28. The rod 31 of the manipulator 28 is thereupon connected to the closure means 18 and the pressures on each side of the closure means are equalised.

It is then possible to unlock or deactivate the closure means 18 and to lower it into the connection portion 8, where it is relocked or reactivated in its new position. After the fluid-tightness of the closure means 18 in its new position has been tested, the rod 31 is disconnected and raised back into the casing 29. The tubular member 3 is then disconnected and the cover 20 is placed on the flange 10. The pipes can be restored to their working pressure.

In order to return the closure means 18 from the lowered position to the raised position, the pressure in the pipes is again reduced, the chamber above the closure means 18 is decompressed, and the cover 20 is removed from flange 10. The tubular member 3 provided with the manipulator 28 is then lowered onto the flanges 10 and 11. Water is pumped through a pipe 46, which is provided with a valve 47 and which passes through the casing 29, while a pressure of an appropriate fluid, for example gas, can be established via a pipe 48 provided with a valve 49 (FIG. 2). After the pressures on the two sides of the closure means 18 have been equalised, the rod 31 is lowered and connected to the closure means 18 in order to deactivate or unlock the latter and raise it to its upper position in which it is reactivated or locked. Fluid-tightness tests are then carried out, after which the rod 31 is disconnected and returned into the casing 29, which is filled with water.

The manipulator 28 is disconnected and withdrawn and replaced by the cover 20. The working pressure can then be restored in the pipes. If necessary, it is possible to reduce the differential pressure on the closure means by increasing the pressure above it with the aid of the pipe 21.

What is claimed is:

1. An assembly of pipes comprising a first pipe submerged in water and provided with a first tubular connection portion, a tubular member detachably connected to said first pipe and having at one end a second tubular connection portion and an external first tubular extension which is coaxial with said second connection portion, the portion of said tubular member which is adjacent said second connection portion extending from the axis of said second connection portion, detachable first connecting means for connecting said first and second connection portions coaxially to one another, displaceable first closure means received in said tubular extension for closing either said tubular extension or said first connection portion and axially displaceable therebetween, and detachable first fastening means for selectively connecting to the end of said tubular extension either a first cover member or a casing of a first manipulator for displacing said closure means between said tubular extension and said first connection portion; and wherein said tubular member establishes a detachable connection between said first pipe and a second pipe and at its other end is provided with a third tubular connection portion, for connection coaxially to a fourth tubular connection portion provided on said second pipe, and a second tubular extension coaxial with said third connection portion, axially displaceable second closure means being provided in said second tubular extension, and detachable second fastening means are provided for selectively connecting to the end of said second tubular extension either a second cover member or a casing of a second manipulator for displacing said second closure means from said second tubular extension to said fourth connection portion so that, with said first and second closure means in said first and fourth connection portions, respectively, said detachable first and second connecting means and said tubular member can be simultaneously detached while maintaining the interiors of the first and second pipes closed to the outside.

2. An assembly according to claim 1, wherein said first connection portion and said first tubular extension are provided with internal grooves for receiving said first closure means.

3. An assembly according to claim 1, including an intermediate slide valve disposed on said first tubular extension so as to be inserted between said first tubular extension and the casing of said first manipulator.

4. An assembly according to claim 1, wherein said first connecting means comprises a connection flange on said first connection portion, and said first fastening means comprises a fastening flange on said first tubular extension similar to said connection flange, such that said first cover member can be connected either to said first tubular extension or to said first connection portion.

5. An assembly according to claim 1, wherein said first closure means is provided with a fifth extension which, when said first closure means is in said first tubular extension, partly reconstitutes the internal geometry which said tubular member would have had in the absence of said fifth tubular extension, said fifth extension serving as a guide for a scraper circulating in the tubular member.

6. An assembly according to claim 1 further comprising: a first cover member selectively connected to said first tubular connection portion and to said first tubular extension; a first manipulator connectable to said first tubular extension; a second cover member selectively connected to said fourth connection portion and to said second tubular extension; and a second manipulator connectable to said second tubular extension.

7. An assembly according to claim 6, wherein at least one pipe provided with a valve extends through each said casing and each said cover member.

* * * * *